Sept. 19, 1939.  J. BIERMANNS  2,173,706
SYNTHETIC CIRCUIT BREAKER TESTING ARRANGEMENT
Filed Jan. 26, 1938
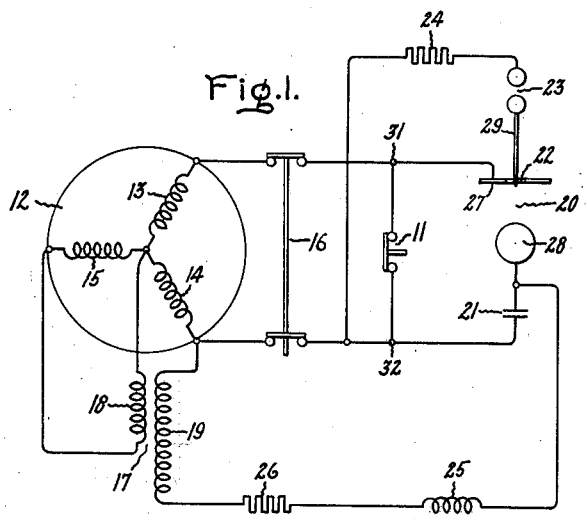
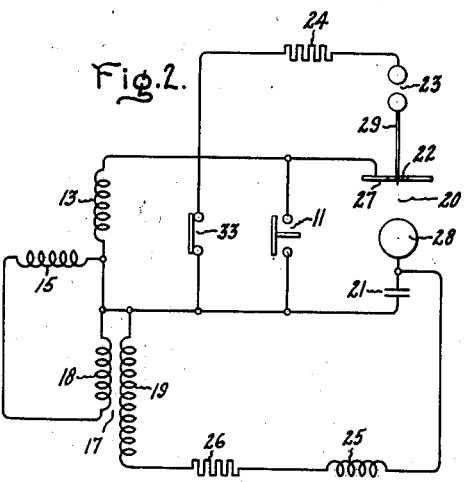
Inventor:
Josef Biermanns,
by Harry E. Dunham
His Attorney.

Patented Sept. 19, 1939

2,173,706

UNITED STATES PATENT OFFICE 2,173,706

SYNTHETIC CIRCUIT BREAKER TESTING ARRANGEMENT

Josef Biermanns, Johannisthal, Germany, assignor to General Electric Company, a corporation of New York Application January 26, 1938, Serial No. 187,055
In Germany February 2, 1937

11 Claims. (Cl. 175—183)

My invention relates to electrical testing and concerns particularly arrangements and methods for testing interrupting devices such as circuit breakers, for example.

It is an object of my invention to provide apparatus for making tests of high apparent power from a low power source.

It is a further object of my invention to provide apparatus for testing under conditions simulating the conditions of short circuit at rated apparent power as they occur in actual practice.

Still another object of my invention is to provide a circuit breaker testing arrangement for supplying recovery voltage exceeding that directly available from the source of short circuit current.

It is likewise an object of my invention to provide a testing arrangement for building up recovery voltage with great rapidity after the passage of current through zero.

It is still a further object of my invention to provide an arrangement in which the recovery voltage does not collapse during short circuit and is not dependent upon the voltage available from a short circuit generator.

It is also an object of my invention to provide an apparatus in which significant results are obtained when current is reestablished in successive half cycles.

Other objects and advantages of my invention will become apparent as the description proceeds.

In carrying out my invention in its preferred form I provide a polyphase short circuit generator even for testing single phase circuit interrupting devices. One or more of the phases of the generator are utilized for supplying short circuit current to the device being tested and the remaining phase is utilized for supplying recovery voltage simulating the recovery voltage occuring in actual practice. Preferably a high voltage step-up transformer is provided in such remaining phase in order to produce high tension recovery voltage. For increasing the energy available during flashover a condenser 21 may be provided in parallel with the high voltage output circuit of the transformer. A spark gap is provided for conveying the simulated recovery voltage to the device being tested and the arrangement is such that the gap breaks down upon the passage of the current through zero as the circuit interrupting device being tested is opened.

The invention will be understood more readily from the following detailed description when considered in connection with the accompanying drawing and those features of the invention which are believed to be novel and patentable will be pointed out in the claims appended hereto. In the drawing Figure 1 is a circuit diagram representing schematically one embodiment of my invention, and Figure 2 is a circuit diagram of a modified arrangement of my invention. Like reference characters are utilized throughout the drawing to designate like parts.

In the apparatus Figure 1 illustrates a method and arrangement for testing circuit interrupting devices such as a circuit breaker or high voltage oil switch 11. Testing current is supplied by alternating current generating means having more than one circuit such as a polyphase alternator 12 for example. The alternator 12 illustrated is a three-phase machine having phases 13, 14 and 15; phases 13 and 14 in this case being connected in series for supplying the testing current. It will be understood that my invention is not limited to this arrangement and, if desired, a quarter-phase or two-phase machine might be utilized in which a single phase serves to supply the testing current. An auxiliary circuit making and interrupting device 16 is provided for connecting the output terminals of phases 13 and 14 to the circuit interrupting device 11 to be tested.

In order that the device 11 may be tested under conditions simulating actual operating conditions with a relatively high recovery voltage in comparison with that which might be obtained from the phases 13 and 14 of the generator 12, I provide a separate arrangement for providing a high voltage simulating recovery voltage. For producing such a simulated recovery voltage without appreciable power being drawn from the generator 12, I provide a step-up transformer 17 having a primary winding 18 connected to the remaining phase 15 of the machine 12 and having a high voltage secondary winding 19 adapted to be connected across the tested device 11, upon the passage of the current therein to zero during the opening operation. In order that the instant of application of the simulated recovery voltage may be controlled, the connection is made through a spark gap 20 connected on one side to one terminal of the device 11 and on the other side to the high voltage terminal of the transformer secondary 19, the low voltage side of the secondary winding of the transformer 17 being connected to phase 14 of the alternator 12. In order to increase the energy available during a flashover a condenser 21 may be provided which is connected in series with the gap 20 across the device 11, and the condenser 21 is thus in parallel with the high voltage winding 19 of the transformer 17.

In order to produce immediate break-down of the sphere gap 20 and discharge of the condenser 21 at the proper instant an igniting gap 22 is provided. The igniting gap 22 is connected across the phases 13 and 14 of the machine 12 supplying the short circuit current. In order that the discharge of the igniting gap 22 may be made more powerful, a series gap 23 may be provided connected in series with the igniting gap 22 and a current limiting resistor 24 across the output terminals of the phases 13 and 14.

When it is desired to test circuit interrupting devices 11 under conditions corresponding to the interruption of a circuit containing an inductive load, the arrangement is made such that the simulated recovery voltage is in quadrature with respect to the testing current supplied by phases 13 and 14 of the machine 12. For this purpose an inductive impedance consisting of an inductance 25 and a resistor 26 in series is connected between the high side of the transformer winding 19 and the point between the gap 20 and the condenser 21. If desired, the gap 20 may be of the sphere gap type consisting of a plate 27 spaced from a sphere 28, and the igniting gap 22 may consist of a needle 29 placed in an opening in the plate 22 and suitably spaced therefrom so that an electro-motive force applied to the needle 29 will break down the gap 22, ionize the surrounding space and produce a breakdown of the main gap 20.

One of the commonly utilized tests for circuit interrupting devices consists of starting with the circuit interrupting device closed, applying a short circuit to it and then opening the circuit interrupting device, often referred to as the CO or Closed-Open Test. In making such a test in the arrangement which I have illustrated the circuit interrupting device 11 is initially closed and for applying the short circuit the circuit breaker 16 is closed. In the drawing Figure 1 illustrates this stage of the operation. Thereupon, the circuit interrupting device 11 to be tested is opened and after a given interval depending upon the type of device and the speed with which it is opened, the arc drawn between the opening contacts is broken and the current falls to zero.

Passage of the current to zero naturally produces some recovery voltage between the testing-current-supplying terminals 31 and 32, although such a recovery voltage is, of course, not comparable in magnitude with that which would occur in case the apparatus were operating under actual conditions with a full-line voltage supplying the short circuit. However, this recovery voltage is sufficient to break down the needle gap 22 which, in turn, causes breakdown of the main gap which thus occurs instantly upon the passage of the testing current through zero. When the gap 20 breaks down the secondary high voltage winding 19 is connected to the testing current supplying terminal 31 and a simulated high recovery voltage is applied to the device 11 as the contacts open. The condenser 21, of course, serves to increase the energy available during application of the recovery voltage and causes the application of the recovery voltage to be followed up by reestablishment of current in case the circuit interrupting device 11 is not capable of withstanding recovery voltage. It will be understood that in case the current should be reestablished during successive half cycles, the transformer winding 19 and the condenser 21 will supply recovery voltage during each of said half cycles for the reason that the intervening periods of non-conduction permit high voltage to be reestablished across the terminals of the condenser 21. Of course, if the current is never interrupted, the phases 13 and 14 of the machine 12 continue to supply short circuit current until destruction of the device 11 and the device 11 is, therefore, subjected to conditions of short circuit current and recovery voltage comparable to those of actual operation in an electric power system.

In case it is desired to make what is known as the OCO or Open-Closed-Open Test, the circuit interrupting device 11 is initially opened and the auxiliary breaker 16 is left closed, or would not be needed in this case. Then the circuit interrupting device 11 is itself closed to produce a short circuit and is thereupon opened to interrupt the short circuit. It will be understood that circuit interrupting devices are ordinarily provided with operating mechanisms which are electrically controlled, and the same control means for use in protecting electrical circuits during commercial use of the circuit breaker are used for causing the circuit breaker 11 to open as soon as the short circuit is produced. These arrangements, however, are well known to those skilled in the art, are not a part of my invention, and are, therefore, omitted for the sake of simplicity in the description and drawing. In order to guard against application of the recovery voltage before the circuit interrupting device 11 has been closed in the OCO Test, an auxiliary switch 33 may be provided as shown in Figure 2 for maintaining the connection of the igniting gap 22 open until the circuit interrupting device 11 has been closed. It will be understood that the auxiliary switch 33 is arranged to remain closed and not to reopen upon the opening of the circuit interrupting device 11.

Figure 2 illustrates, also, an arrangement in which a two-phase machine is used instead of a three-phase machine for supplying testing current and voltage, and the phase 13 is utilized for supplying testing current whereas the phase 15 is utilized for energizing the voltage supplying arrangement. For producing a simulated recovery voltage it will be understood that, if desired, a special machine might be employed in which one phase winding of Figure 1 or Figure 2 was wound for high voltage so as to obviate the necessity of interposing the step-up transformer 17. Although in Figures 1 and 2 as illustrated the current-supplying and simulated-voltage-supply circuits are different phases of the same electrical machine, it will be understood that my invention is not limited to this precise arrangement, and includes other suitable arrangements such as separate generators for supplying current and voltage, that operate on the same shaft or are otherwise suitably arranged obtaining synchronism between the testing current and the simulated-recovery voltage.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. An arrangement for testing circuit interrupting devices comprising a polyphase generator, a step-up transformer having a primary winding connected to one phase of the generator and a secondary winding, an auxiliary circuit making and interrupting device for connecting another phase of the generator to a current interrupting device to be tested, a spark gap and a condenser connected as a series unit with connections for connecting the series unit across the circuit interrupting device to be tested, an igniting spark gap connected to said first mentioned gap, a series gap with connections to said igniting gap and the phase of the generator which is adapted to be connected to the circuit interrupting device to be tested, an inductive impedance connecting one side of the secondary winding of said transformer to the common point of said gap and condenser in the said series unit, and a connection between the other side of said secondary winding and the last mentioned phase of the generator.

2. In combination a generator having a plurality of phases, a step-up transformer having a primary winding connected across one of the phases of the generator and having a secondary winding connected on one side to a second phase of the generator, a pair of testing-current-supplying terminals, an auxiliary circuit making and interrupting device for connecting said terminals to the second phase of the generator, a circuit interrupting device connected between said terminals, a spark gap and a condenser connected in series between said terminals, an igniting spark gap connected to said first mentioned gap, a series gap with connections to said igniting gap and that one of said terminals which is connected to said condenser, and an inductive impedance connected to the remaining side of the transformer secondary winding and to the common point of said first mentioned gap and said condenser.

3. An arrangement for testing circuit interrupting devices comprising a polyphase generator, a step-up transformer having a primary winding connected to one of the phases of the generator and having a secondary winding, a pair of testing current-supplying-terminals connected to another phase of the generator and adapted to be connected to a circuit interrupting device to be tested, a spark gap and a condenser connected in series between said terminals, an igniting spark gap connected to said first mentioned gap, and a series gap with connections to said igniting gap and that one of the said terminals which is connected to the said condenser, the secondary winding of said transformer being connected across said condenser.

4. An arrangement for testing circuit interrupting devices comprising a polyphase generator, a step-up transformer having a primary winding connected to one of the phases of the generator and having a secondary winding, an auxiliary circuit making and interrupting device, a pair of testing-current-supplying terminals adapted to be connected to a circuit interrupting device to be tested, an auxiliary circuit making and interrupting device for connecting said terminals to a second phase of said generator, a spark gap and a condenser connected in series between said terminals, means responsive to a recovery voltage of said second phase of the generator for breaking down said spark gap, and an inductive impedance connecting one side of the secondary winding of said transformer to a point between said spark gap and said condenser, the other side of said secondary winding being connected to the second phase of said generator.

5. An arrangement for testing circuit interrupting devices comprising a polyphase generator, a pair of testing-current-supplying terminals connected to one of the phases of said generator and adapted for connection to a circuit interrupting device to be tested, a spark gap and a condenser connected in series between said terminals, means for energizing said condenser from another phase of said generator and means for breaking down said spark gap in response to recovery voltage of the first phase of said generator.

6. In combination a polyphase generator, a pair of testing-current-supplying terminals connected to one of the phases of said generator, a circuit interrupting device to be tested connected between said terminals, a spark gap and condenser connected in series between said terminals, means for energizing said condenser from another phase of said generator and means for breaking down said spark gap in response to recovery voltage of the first phase of said generator.

7. An arrangement for testing circuit interrupting devices comprising a polyphase generator, a pair of testing-current-supplying terminals adapted to be connected to one phase of the generator and adapted to be connected to a circuit interrupting device to be tested, a condenser and a spark gap connected in series between said terminals, an inductive impedance, means connected for energizing said condenser from another phase of said generator through said impedance, and means responsive to a recovery voltage of the first phase of said generator for breaking down the said spark gap.

8. An arrangement for testing circuit interrupting devices comprising an alternating current generating means provided with a plurality of synchronized circuits, a pair of testing-current-supplying terminals connected to one of said circuits and adapted to be connected to a circuit interrupting device to be tested, a condenser and a spark gap connected in series between said terminals, means for energizing said condenser from another circuit of said generating means, and means responsive to recovery voltage of the first circuit for breaking down said spark gap.

9. An arrangement for testing circuit interrupting devices comprising alternating current generating means having a plurality of circuits, a pair of testing-current-supplying terminals connected to one of said circuits and adapted to be connected to a circuit interrupting device to be tested, means energized by a second of said circuits for producing a high voltage, a spark gap for connecting said high voltage means to said terminals, an igniting spark gap for breaking down said first mentioned spark gap in response to recovery voltage of the first mentioned circuit of the generating means, said igniting spark gap being connected on one side to one of said terminals and having connections including a switch for connecting it to another of said terminals, and means for closing said switch as the circuit breaker to be tested is closed.

10. In combination an alternating current generating means having a plurality of synchronized circuits, testing-current-supplying terminals connected to one of said circuits, a circuit interrupting device to be tested connected between said terminals, high voltage generating means energized by a second of the circuits of said first mentioned generating means adapted to be connected to said terminals, and means responsive to recovery voltage of the first mentioned circuit for connecting said high voltage generating means to said terminals.

11. An arrangement for testing circuit interrupting devices comprising an alternating current generating means including a plurality of synchronized circuits, testing-current-supplying terminals connected to one of said circuits and adapted to be connected to the circuit interrupting device to be tested, a high voltage generating means energized by a second of said circuits, and means responsive to the recovery voltage of the first of said circuits for impressing a voltage from said high voltage generating means across said terminals.

JOSEF BIERMANNS.